Dec. 20, 1949     E. LAXO     2,491,616
SOLDER HORN FOR CAN BODY SIDESEAMERS
Filed Oct. 8, 1946     3 Sheets-Sheet 1

INVENTOR.
ED LAXO
BY
Mellin & Hanscom
ATTORNEYS

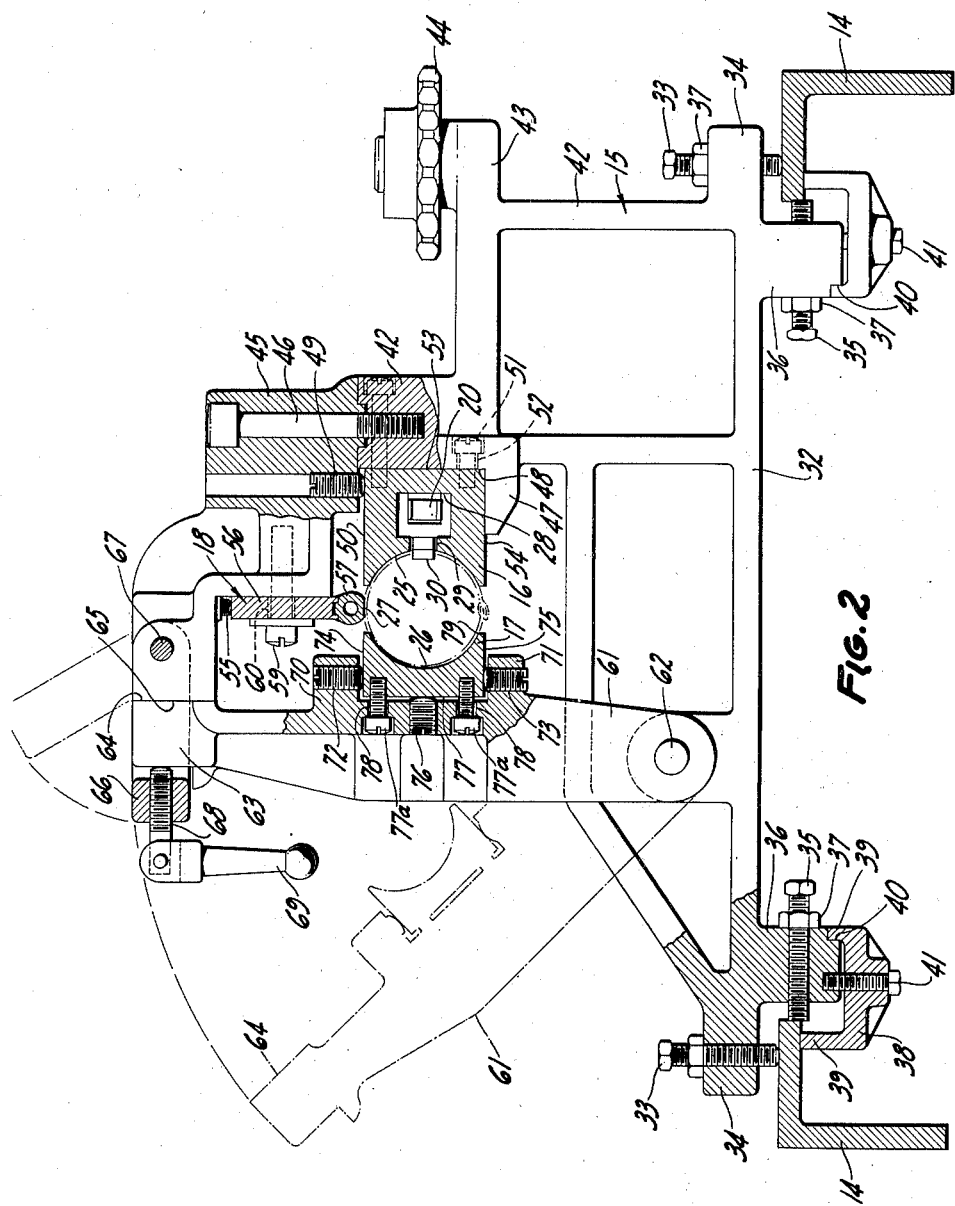

Dec. 20, 1949   E. LAXO   2,491,616
SOLDER HORN FOR CAN BODY SIDESEAMERS
Filed Oct. 8, 1946   3 Sheets-Sheet 3
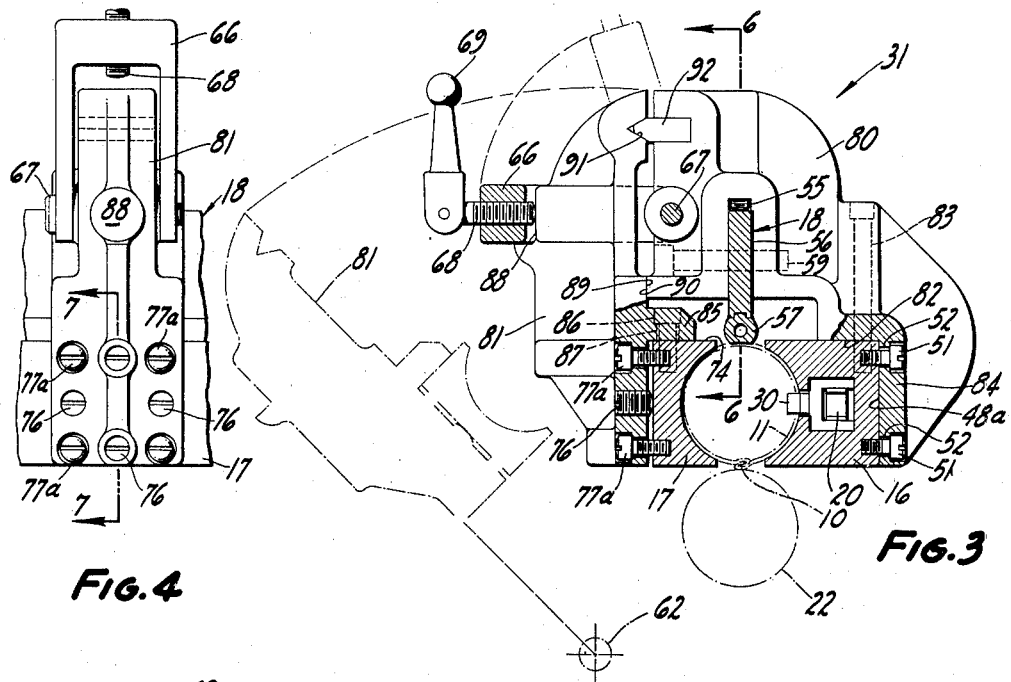
FIG.4
FIG.3
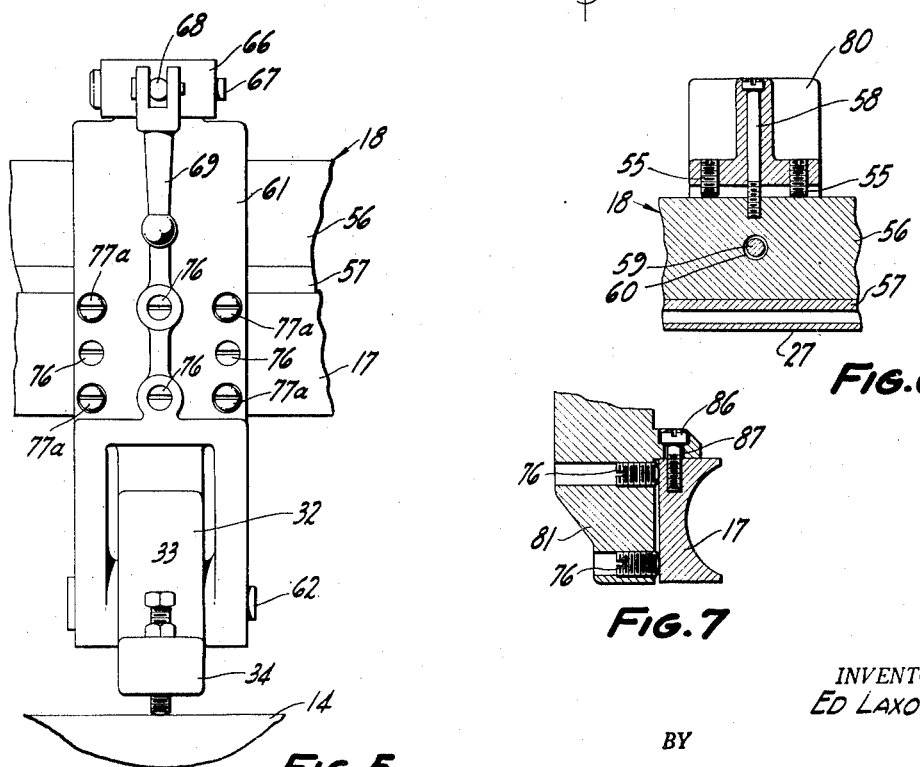
FIG.5
FIG.6
FIG.7
INVENTOR.
ED LAXO
BY
Mellin & Hanscom
ATTORNEYS Patented Dec. 20, 1949

2,491,616

UNITED STATES PATENT OFFICE 2,491,616

SOLDER HORN FOR CAN BODY SIDE SEAMERS

Ed Laxo, Oakland, Calif., assignor to Atlas Imperial Diesel Engine Co., Oakland, Calif., a corporation of Delaware Application October 8, 1946, Serial No. 701,976

2 Claims. (Cl. 113—115)

The present invention relates to apparatus for soldering the side seams of metal can bodies.

In the conveying of can bodies through the solder horn of a sideseamer, it is important that the guiding surfaces of the solder horn rails lie on a true circle, with the rails straight and parallel, to insure against flexing or disturbing of the can bodies as they proceed through the solder horn, thereby producing satisfactory solder bonded side seams. Any variation in the relative positions of the rails alters the size or shape of the opening through which the can bodies pass, forcing them from their true desired circular shape and disturbing the solder bond side seam, which may leak when subjected to the temperatures and pressures encountered in food processing.

The maintenance of the guide rails in their desired relative positions is rendered difficult by the range of temperatures to which they are exposed. That portion of the solder horn lying above the solder bath is subjected to high temperatures, while another portion disposed above the cooling ducts has a much lower temperature. The natural tendency of these opposed circumstances is to buckle or warp the rails, producing their misalignment. Misalignment is also induced by the inability to provide direct support for the rails at certain points along the apparatus because of interference with other working parts and by such variables as unevenness of the sideseamer frame, machining inaccuracies, etc.

In the operation of a can body sideseamer, it is essential, from time to time, to open the solder horn for the removal of jammed or bent can bodies, cleaning of the rail surfaces contacting the can bodies, or for inspection of the can gripper finger portions of the conveyor chain. Such opening of the solder horn has heretofore resulted in misalignment of the rails upon reclosing, usually caused by accumulations of tin dust, solder particles, or flux on the mating parts, or by the distortion of the long top rail of relatively small cross-section, resulting from the very act of its movement to and from assembled position in the apparatus. Accordingly, the misaligned rail condition existing upon reclosing of the solder horn produces an uneven and uncontrolled pressure of the guide rails against the can bodies, which are caused to flex, distorting the solder bond within the side seams.

It is also a fact that the acts of opening and closing the solder horn has heretofore produced squeezing or damaging of the can bodies, to the detriment of a good solder bond in their side seams.

Accordingly, it is an object of the present invention to provide a can body sideseamer whose guide rails may be maintained in appropriate relative position and alignment regardless of the varying temperatures to which they are subjected.

Another object of the invention is to provide a can body sideseamer having a solder horn capable of being opened without disturbing the relative positions and alignment of the guide rails upon reclosing.

Still another object of the invention is to provide a can body sideseamer whose solder horn can be opened and reclosed without damaging or squeezing the can bodies passing between the guide rails of the horn.

A further object of the invention is to maintain the proper disposition and alignment of the guide rails of a solder horn at points along the can body sideseamer at which direct support cannot be provided by the sideseamer frame.

Another object of the invention is to provide a can body sideseamer whose solder horn rails can be adjusted in appropriate spaced relation to one another and in alignment to an extreme degree of accuracy, irrespective of unevenness of the sideseamer frame, minor machining errors, and other undesirable variable factors encountered in practice.

Yet a further object of the invention is to provide for the adjustment of the solder horn rails of a can body sideseamer while the apparatus is in operation with can bodies progressing through the solder horn.

Another object of the invention is to provide a solder horn top rail assembly whose straightness is affected neither by opening or reclosing of the solder horn nor by temperature variations along its length.

One form which the invention may assume is exemplified in the following description and illustrated by way of example in the accompanying drawings, in which:

Fig. 2 is a cross-section through the sideseamer taken generally along the line 2—2 of Fig. 1, parts being broken away.

Fig. 3 is a cross-section taken generally along the line 3—3 on Fig. 1, parts being broken away.

Fig. 4 is a side elevation of the soldering horn seen from the left of Fig. 3.

Fig. 5 is a side elevation of part of the sideseamer as seen from the left of Fig. 2.

Fig. 6 is a longitudinal section taken along the line 6—6 of Fig. 3.

Fig. 7 is a longitudinal section taken along the line 7—7 of Fig. 4.

Figure 1:
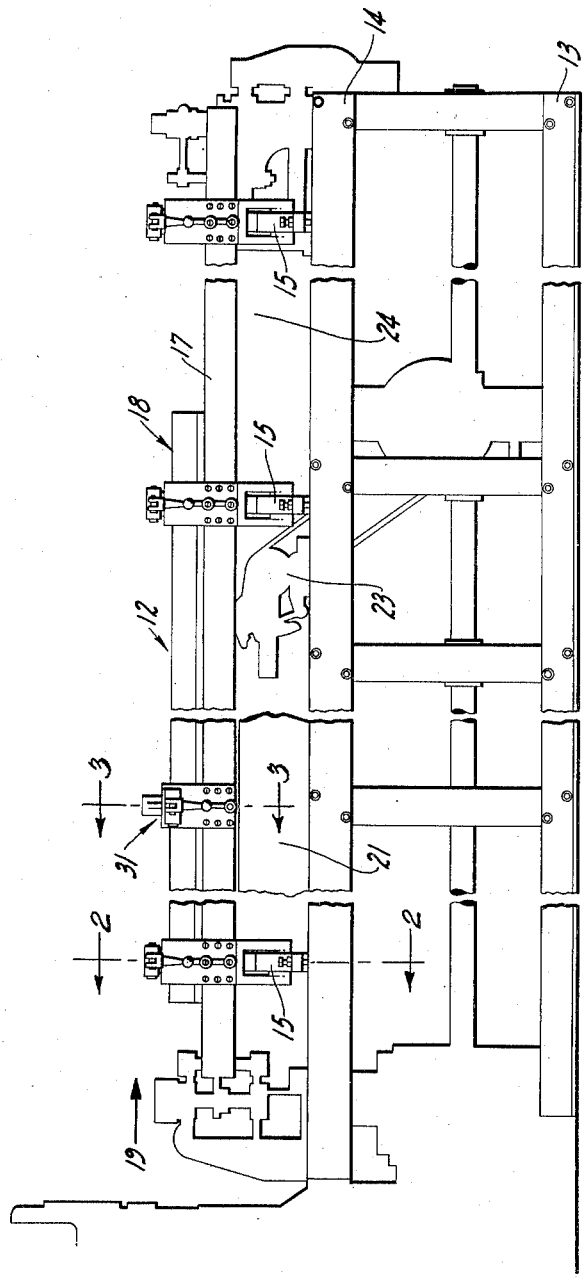
Fig. 1 is a side elevation of a can body sideseamer embodying the invention.

The apparatus disclosed in the drawings is a sideseamer for soldering the side seams 10 of cylindrical can bodies 11 as they are propelled through the solder horn 12 of the device. The sideseamer includes a frame or base 13 having longitudinally extending and oppositely arranged angle plates or ways 14, 14 on which are mounted a plurality of longitudinally spaced brackets 15 for supporting the guiding rails 16, 17, 18 of the solder horn. The can bodies are propelled through the horn in the direction of the arrow 19 (Fig. 1) by a suitable chain 20 engaging the ends of the bodies; passing such can bodies with their side seams 10 facing downwardly through the solder bath 21 and in contact with the rotating solder roll 22; thence through a wiping station, where a cloth buff 23 or the like removes the excess solder from the seam; and then through a cooling station 24 where the solder is cooled and solidified in the seam.

The solder horn 12 consists of opposed side rails 16, 17, which are hollowed out to form surfaces 25, 26 lying on arcs of a circle, and a top rail 18, which is also arcuately shaped along its under-surface 27 to lie on a true circle. The top rail 18 presses the can bodies downwardly to hold their side seams 10 against the solder roll 22 of the apparatus. One side rail 16 is provided with a longitudinal slot 28 through which the conveyor chain 20 may pass, and also with a longitudinal opening 29 affording communication between the slot and the circular or cylindrical space between the rails, through which can end engaging dogs 30 on the chain may move.

The rails 16, 17, 18 are held and adjusted in proper parallelism with respect to one another, to form a true circular guiding and supporting surface for the can bodies, by a plurality of spaced brackets. Most of the brackets 15 are supported directly from the opposed angle plates 14 of the frame or base 13, but in view of the interference of other working parts at the solder bath 21, the direct support by the frame cannot be provided in that region of the apparatus. Accordingly, a different form of rail support 31 is provided at the solder bath station.

The supporting members 15 each consist of a generally L-shaped bracket assembly 32 which is adjustably clamped to the angle plates 14. Adjustment screws 33 extend through the ends 34 of each bracket and engage the upper surfaces of the angle plates 14 to shift the bracket 15 vertically with respect to the frame or base 13. Horizontal or lateral adjustment is provided by adjustment screws 35 threaded through depending legs 36 of the bracket, with the ends of the screws 35 engaging the inner edges of the angle plates 14. Following the appropriate adjustment of the bracket both vertically and horizontally through proper manipulation of the adjustment screws 33, 35, the latter are prevented from turning by tightening lock nuts 37 against the bracket extensions 34, 36. The entire bracket is clamped to the angle plates 14 by clamping members 38, whose flanges 39 engage the undersides of the angle plates and the walls of recesses 40 in the bracket. The clamping action results from the tightening of clamp screws 41 extending through the clamp members 38 and threaded in the bracket legs 36.

The L-shaped bracket member 32 has an upright leg 42 and is also provided with a lateral extension 43 on which a sprocket 44 for the conveyor chain 20 may be rotatably mounted. A bracket upright 45 is mounted firmly on the upper end of the bracket leg 42, being clamped thereto by one or more elongate cap screws 46 extending through holes in the upright into downward threaded engagement with the leg. This upright 45 extends transversely towards a movable side rail 17 of the solder horn.

The other side rail 16 lies lengthwise of the machine and rests upon inwardly extending bracket ledges 47, also engaging the inner face 48 of the upright bracket leg 42. The side rail 16 is urged against each ledge 47 by a set screw 49 threadedly received in the extension 45 and bearing downwardly against the upper surface 50 of the rail. Cap screws 51 extend transversely through enlarged holes 52 in the bracket 32 and its leg 42 for threaded reception in the side rail 16. When tightened, these screws 51 serve to draw the outer face 53 of the rail firmly against the abutting face 48 of the bracket leg 42. It is apparent that the enlarged holes 52 in the bracket permit slight vertical shifting of the side rail under the clamping action of the set screw 49. If desired, suitable shims (not shown) may be provided between the ledge 47 and the bottom face 54 of the rail, and between the bracket leg 42 and the side face 53 of the rail, prior to tightening of the set screw 49 and cap screws 51, in order to properly locate the side rail 16 in the desired position.

The top rail 18 also extends longitudinally of the apparatus, being firmly secured to the bracket extension 45. Set screws 55 are threaded into the upper portion of the extension, and bear against the upper member 56 of the top rail, to determine its downward position and also the downward position of its lower portion 57 (secured to the upper portion), which has the bottom arcuate surface 27, and which is formed as a hollow tube to permit the circulation therethrough of a cooling fluid. Vertically arranged supporting screws 58 also extend downwardly through the extension 45 into threaded engagement with the upper portion 56 of the top rail, for the purpose of supporting the same approximately in adjusted position on the extension. The set screws 55 determine the vertical position of the top rail 18 with respect to the extension 45. The supporting screws 58 can then be tightened to hold the top rail in such vertical position. Lateral movement of the top rail is prevented by cap screws 59 extending through enlarged holes 60 in the top rail for threaded reception in the bracket extension 45.

The opposed guide rail 17 is adjustably mounted on a swingable leg 61, whose lower end is supported on a pivot pin 62 mounted in the L-shaped bracket member 32. The leg extends upwardly and is provided with a clamping boss 63 at its upper end and an inner surface 64 adapted to abut a complemental surface or face 65 on the upright extension 45. When swung inwardly, the leg 61 may be clamped in position by a suitable yoke assembly 66 straddling the extension upright and pivotally mounted thereon, as by pivot pin 67 extending through the yoke and extension 45. The yoke assembly has a clamp screw 68 extending through its outer portion into engagement with the clamp boss 63, and this clamp screw may be tightened or loosened by means of an operating lever pivoted 69 thereto. When the yoke asembly 66 is swung to a horizontal position and the clamp screw 68 tightened against the boss 63, the leg is, in effect, rigidly and firmly secured to the bracket member 32 and its extension upright 45, further movement then being incapable of occurring.

Reference is now made more particularly to Fig. 2. Fig. 2 constitutes a section taken generally along the line 2—2 of Fig. 1 but the section deviates slightly from the plane bisecting supporting member 15 so as to show certain adjustment screws which are spaced slightly from the bisecting plane. Intermediate its ends, the leg 61 has a pair of opposed inwardly extending arms 70, 71 between which the other side rail 17 is adjustably mounted and secured. This side rail is held between the arms and on the leg by upper and lower set screws 72, 73 threaded into the arms and engaging the top and bottom surfaces 74, 75 of the rail, and also by laterally disposed set screws 76 threaded into the main portion of the leg 61 and engaging the outer face 77 of the guide rail. By apropriate threading or turning of the set screws 72, 73, 76, the vertical position, and also the lateral position, of the side rail 17 with respect to the other side rail 16 and with respect to the top rail 18, may be adjusted. When appropriately positioned so that its hollowed out can body guide face 26 lies on a circle, which also coincides with the guide faces 25, 27 of the other side rail 16 and top rail 18, cap screws 77a, extending through enlarged holes 78 in the leg 61 and threaded into the side rail 17, may be tightened to secure the guide rail in its position of adjustment.

It is to be noted that the pivot pin 62 for the swingable leg 61 is so disposed with respect to the inwardly disposed lower lip 79 of the movable guide rail 17 as not to damage the can bodies by a squeezing or other action when the leg is swung outward and downward to open the solder horn. Such opening can occur upon loosening the clamp screws 68 and swinging the yokes 66 upwardly to a position clear of the legs 61, whereupon the latter may be swung outwardly to allow the removal of can bodies or inspection and cleaning of the inner parts of the solder horn mechanism.

The interference of other working parts precludes the positioning of one or more supporting brackets carried by the angle plates or ways 14 in the region of the solder bath 21. For that reason, a somewhat modified form of rail bracket arrangement 31 is provided at the station mentioned. This arrangement is best shown in Fig. 3 which constitutes a section taken generally along the line 3—3 of Fig. 1 but the section deviates slightly from the plane bisecting the element 31 so as to show certain adjustment screws which are spaced slightly from the bisecting plane. Specifically, it includes a pair of opposed upright castings 80, 81, one of which is connected to a side rail 16 in substantially the same manner as described in connection with the other bracket 15. However, instead of this rail engaging a ledge 47, as in the other bracket arrangement, it is drawn firmly against an upper surface 82 of the casting 80 by suitable cap screws 83. This side rail, as described in connection with the other bracket, is also held firmly against the surface 48a of the casting leg 84 by suitable cap screws 51 passing through enlarged casting holes 52 and threaded into the guide rail 16. The top rail 18 is held firmly in the upright casting member 80 and adjusted in proper position in substantially the same manner as it is adjustably mounted in the other bracket 32, 45. That is, supporting and set screws 55, 58 carry the rail in proper vertical position and cap screws 59 clamp the rail 18 against lateral movement.

The other side rail 17 is also secured to the other upright casting 81 by set and cap screws 76, 77 in much the same manner as it is adjustably fastened to the swingable bracket leg 61, with the exception that it is held firmly against the upper, inner arm 85 of the casting by cap screws 86. In view of the fact that no direct support from the frame or base 13 of the sideseamer apparatus is provided at the soldering station, the upper and lower set screws 72, 73 of the other brackets are not provided, but the upper surface 74 of the side rail 17 is held firmly against the arm 85, or intervening shims (not shown), if required, by suitable vertically arranged cap screws 86 extending through enlarged holes 87 in the arm and threaded into the rail 17. However, lateral adjustment is still provided by set screws 76 and cap screws 77a in substantially the same manner as on the swingable leg arrangement.

The upright casting or bracket member 81 may be clamped to the opposed casting or bracket member 80 by a yoke asembly 66 straddling the upright casting 81 and mounted on a pivot pin 67 passing through the other bracket 80. This yoke, when swung to horizontal position over the side rail bracket 81, serves to effect a clamping action by virtue of engagement of its clamp screw 68 against the back face 88 of the bracket 81, which engages lower abutting surfaces 89, 90 on the right castings 80, 81, and also positions a generally V-shaped recess 91 on one casting 81 firmly against a wedge shaped key 92 secured in the other casting 80, providing automatic alignment of the lefthand casting 81 (as seen in Fig. 3) with respect to the other casting 80, and appropriate positioning of the left side rail 17 with respect to the right side rail 16 and top rail 18 of the solder horn 12.

The bracket arrangement at the solder bath, consisting of one or more brackets 31 of the type shown in Fig. 3, while not providing direct support from the frame 13 to the rails, nevertheless does form a truss with the rails, tending to hold them in appropriately spaced position with respect to one another with substantially no deflection, and with each member 16, 17, 18 aligned throughout its extended length.

By virtue of the apparatus described, adjustments may be made to appropriately initially position the rails 16, 17, 18 in alignment prior to placing the machine in operation, and also during the time that the machine is actually operating. The brackets 15 may be adjusted with respect to the frame or base 13 through suitable manipulation of the adjustment screws 33, 35 and clamp screws 41 to align the brackets 15, offsetting any inaccuracy or unevenness in the ways 14. Also, the rails 16, 17, 18 may be adjusted initially through suitable manipulation of the various set screws 49, 72, 73, 76, 55 until their arcuate surfaces 25, 26, 27 lie on a true circle with each of the rails lying in a straight line throughout its length. Such adjustments may be made with the rails subject to the varying degrees of temperature encountered in the apparatus. For example, the temperature at the solder bath 21 where the molten solder is deposited on the can body side seam is much higher than the temperature at the cooling station 24, which tends to warp the rails. Such warpage may be overcome and compensated for by appropriate turning of the set screws and subsequent clamping of the cap screws 51, 59, 77 and supporting screws 58 to insure that alignment of each rail is obtained and maintained with the rails properly positioned with respect to one another.

Not only can adjustments be made prior to the conveying of can bodies through the solder horn, but they can be made during the time that the mechanism is operating, since the various adjustment screws are readily accessible from the exterior of the solder horn. In the event that any warpage or distortion in the can bodies is noticed during operation of the apparatus, suitable steps can be taken without shutting down the machine.

The relatively small cross-section of the top rail 18 with respect to its extended length makes the latter readily susceptible to distortion and misalignment as a result of the varying temperatures along its length. Such distortions are overcome in the present instance by forming the lower portion 57 of the top rail as a hollow tube through which a coolant may be circulated during operation of the device, thus maintaining the temperature of the tube fairly uniform throughout its length and preventing its distortion as a result of temperature differentials.

The brackets 15, 31 may be opened and the side rail 17 moved outwardly without distorting or damaging the can body. Such opening is desirable for the purpose of inspecting or cleaning the apparatus or for removing cans jammed in the solder horn 12. Opening of the solder horn is effected very rapidly by loosening the yoke clamp screws 68, and swinging the yokes 66 upwardly to open position, which permits the bracket legs 61 to be swung outwardly, carrying the side rail 17 outwardly with them. The side rail 17 also removes the upright casting 81 at the soldering station from the opposed upright casting 80 and fixed side rail 16 without any further action or movement of parts being required. The location of the bracket leg pivot pins 62 permits the side rail 17 to be moved away from the can body without damaging it.

After the jammed cans have been removed, or the cleaning or inspection has taken place, the legs 61 and rail 17 are swung back inwardly to permit return of the yoke assemblies 66 to clamped positions, with the clamp screws 68 tightened against the cooperable abutting portions 63, 88. The side rail 17 is thus repositioned in its exact initial location opposed to the other side rail 16, and in alignment throughout its length.

Alignment of the side rails in their proper position upon re-closing of the solder horn is assured since there are no foreign particles in the way of its movement to its initial position, which might tend to prevent its repositioning in the desired location. It is evident that the legs 61 are swingable freely, in that there is nothing in the nature of tin dust, solder or flux to deposit on any surfaces, acting as a barrier to return of the side rail 17 to its original position. All engaging surfaces and clamping parts are above the path of movement of the can bodies and also above the molten solder, allowing small opportunity, if any, for these surfaces to become impaired with foreign particles. In any event, should any particles so deposit on them, they may be readily observed prior to closing of the solder horn and easily removed.

It is also to be noted that the solder horn 12 may be opened without shifting the position of the top rail 18, of relatively small cross-section as compared with its length. The very act of moving the top rail laterally would cause distortion and require its re-alignment. However, the solder horn may be opened and re-closed without altering the position of the top rail in any particular. The only guide member which is moved is the side rail 17, which is of comparatively large cross-section and, therefore, not easily distortable during shifting of the bracket legs 61 to open and closed positions.

It is apparent that a can body sideseamer has been provided in which the guiding rails of the solder horn are maintained in accurate alignment and appropriately disposed with respect to one another, to provide a circular opening for guiding the cylindrical can bodies, with their side seams disposed downwardly against the solder roll of the apparatus. The entire device is readily adjustable and the entire mechanism may be opened and closed in a minimum of time for the performance of required functions or operations on the apparatus.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A machine for soldering the side seams of cam bodies comprising a framework, first and second can body guide rails disposed opposite one another and supported by relatively movable portions of said framework, means for securing said portions in relatively fixed operating positions, adjustable mounting means between said second guide rail and its supporting portion of said framework for shifting said second rail to move its longitudinal axis vertically and horizontally to change the position and direction of said axis and to rotate the second rail about its said axis to thereby bring said second rail into precise alignment with said first rail, said adjustable mounting means including screws movable at right angles to one another transversely of said second rail supporting portion.

2. A machine for soldering the side seams of can bodies comprising a framework, first and second can body guide rails disposed opposite one another and supported by relatively movable portions of said framework, means for securing said portions in relatively fixed operating positions, adjustable screw mounting means between said second rail and its supporting portion of said framework for shifting said second rail to move its longitudinal axis vertically with respect to said supporting portion, and other adjustable screw mounting means between said second rail and its supporting portion of said framework for shifting said second rail to move its longitudinal axis horizontally with respect to said supporting portion and to change the position and direction of said axis and to rotate the second rail about its said axis to thereby bring said second rail into precise alignment with said first rail.

ED LAXO.

REFERENCES CITED

The following references are of record in the file of this patent:

UNITED STATES PATENTS

| Number | Name | Date |
|---|---|---|
| 989,249 | Graham | Apr. 11, 1911 |
| 1,476,405 | Kronquest | Dec. 4, 1923 |
| 1,639,955 | Murch | Aug. 23, 1927 |
| 1,740,683 | Kruse | Dec. 24, 1929 |
| 1,767,900 | Schaal | June 24, 1930 |
| 1,768,015 | Troyer | June 24, 1930 |
| 1,939,723 | Peters | Dec. 19, 1933 |
| 2,357,402 | Hasse | Sept. 5, 1944 |